May 5, 1970          P. NADOR          3,510,759
METHOD AND APPARATUS FOR GAUGING AND ADJUSTING
MULTIPLE CONTACT RELAYS
Filed July 18, 1966          7 Sheets-Sheet 1

INVENTOR.
PETER NADOR

BY *Westell & Hanley*

LEGEND ~
——————— INITIAL POSITION
———·——— FINAL POSITION
- - - - -► MAGNITUDE OF ADJUSTMENT

INVENTOR.
PETER NADOR
BY Westell & Hanley

INVENTOR.
PETER NADOR
BY
Westell & Hanley

INVENTOR.
PETER NADOR

BY Westell & Hanley

United States Patent Office 3,510,759
Patented May 5, 1970

3,510,759
METHOD AND APPARATUS FOR GAUGING AND ADJUSTING MULTIPLE CONTACT RELAYS
Peter Nador, Ottawa, Ontario, Canada, assignor to Northern Electric Company Limited, Montreal, Quebec, Canada
Filed July 18, 1966, Ser. No. 566,051
Int. Cl. G01r 31/02
U.S. Cl. 324—28          7 Claims

ABSTRACT OF THE DISCLOSURE

A method and apparatus for gauging and adjusting multiple contact relays in which the movement of the armature between the operation of each individual contact and its contact with a stop is measured by a sequence of pulses. The deviation, from a nominal line, of armature displacement at the time of operation of each contact is reduced by determining the mean line of displacement and rotating the fixed contacts to bring the mean and nominal lines into coincidence.

---

The present invention relates to relays and more particularly to a method of gauging the individual contacts in a relay having a plurality of contacts. The invention also relates to means for adjusting such relays to obtain a proper timing in the operation of the contacts.

Relays are in common use having a row of contacts actuated by an armature, an example being the wire spring type of relay used in telephone switching systems. Such relays usually consist of two rows or combs of movable wire spring contacts, one row of make contacts and one row of break contacts, with a row of fixed contacts interposed between them. The movable rows of contacts are actuated by a coil-wound core and armature assembly through a card.

In such wire spring relays the contacts operate before the armature reaches its limits of travel to compensate for jarring, to prevent wear, and to ensure operability. It therefore becomes necessary to have a defined relationship between the gap value of the armature with respect to the core of the relay and the time of make or break of each movable contact (i.e. the time of mechanical operation of the contact) with its associated fixed contact. In other words, each contact must operate within a specified range of armature gap values. To date it has been usual to adjust the contacts manually to achieve this. Such adjustment is effected by first inserting maximum and minimum thickness gauges between the core and the armature to determine whether or not the movable contacts operate within the permissible limits. If the alignment is faulty it can be corrected by mechanically adjusting the fixed contacts through a leg connecting them with the core plate. It will be appreciated that such manual gauging and adjustment is time consuming and costly.

Consideration has been given to automatic methods and apparatus for the gauging and adjustment of relays. An automatic gauging method and apparatus is disclosed in U.S. Pat. No. 2,840,780 issued June 24, 1958 to J. G. Weeks and an apparatus for mechanically adjusting the fixed contacts has been disclosed in U.S. Pat. No. 2,940,036 of Weeks dated June 7, 1960. In the method disclosed by Weeks the relay is operated and during such operation the armature gap value at which each contact closes or opens is measured by creating an electrical pulse from the change in coil current as the contact operates and again as the armature is stopped by the core. Assuming a constant velocity of the armature moving in the relay and a uniform armature velocity for different individual relays of the same type, the time between the pulses is measured and compared with specified requirements and an adjustment of the fixed contacts is made according to the result of this comparison, the armature velocity being known. However, it has been found by oscillogram studies that in fact these armature velocities are not constant or uniform, which reduces the accuracy and effectiveness of the method. Moreover, since analog principles are employed the accuracy and efficiency are further reduced over what would be obtainable under a digital system. Also, the total armature travel cannot be measured by the system to enable adjustment or rejection of the unit.

It is an object of the present invention to provide an improved method of gauging the time of operation of each individual contact in a plurality of movable contacts of an armature-actuated relay with a plurality of fixed contacts with respect to the armature gap value of the relay.

It is a further object of the present invention to provide an improved method of reducing the deviation in the time of operation of each individual contact in a plurality of movable contacts with a plurality of fixed contacts in an armature-actuated relay.

Another object of the invention is to provide an apparatus for gauging the time of operation of each individual contact in a plurality of movable contacts of an armature-actuated relay with a plurality of fixed contacts with respect to the armature gap value of the relay.

Still another object of the invention is to provide an apparatus for reducing the deviation in the time of operation of each individual contact in a plurality of movable contacts with a plurality of fixed contacts in an armature-actuated relay.

To accomplish these and other objects the invention in its broadest aspect consist of a method of gauging a relay of the type described with respect to the first of the above mentioned objects, comprising the steps of energizing the relay to move the armature towards a stop whereby the contacts are operated during said movement, generating a sequence of pulses where the number of pulses is substantially proportional to the movement of the armature towards the stop, and counting the pulses with respect to each contact during the portion of the armature movement when that contact is closed. To reduce the deviation in the time of operation of each individual contact the steps set out above are augmented by evaluating the pulse count to determine the displacement of the armature from the stop at the time of operation of each individual contact, determining the movement required to rotate the row of fixed contacts about an axis to reduce the deviation of armature displacement at the time of operation of each individual contact, and moving the row of fixed contacts accordingly. The invention also resides in apparatus to carry out the above mentioned steps.

An example embodiment of the invention will now be described with reference to the accompanying drawings in which:

FIG. 3 is a schematic diagram of the location of the set of fixed contacts and one set of movable contacts in the relay of FIG. 1, FIG. 3a showing the ideal location, FIG. 3b showing the actual location, and FIG. 3c showing equivalent location where the movable contacts are aligned;

Figure 1:
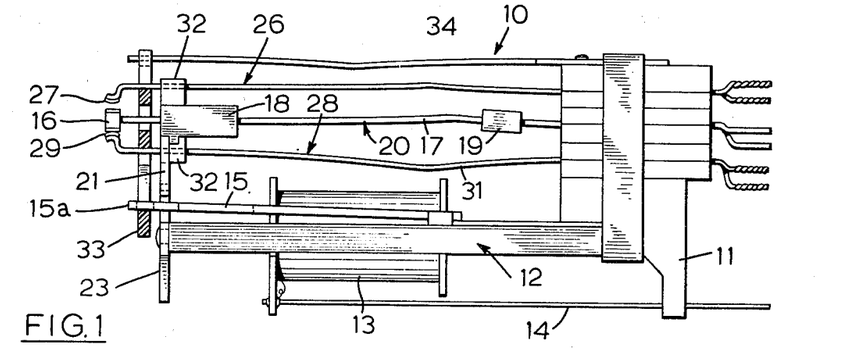
FIG. 1 is a side view, partly in section, of a wire spring relay of the type gauged and adjusted by the method and apparatus of the invention.
Figure 2:
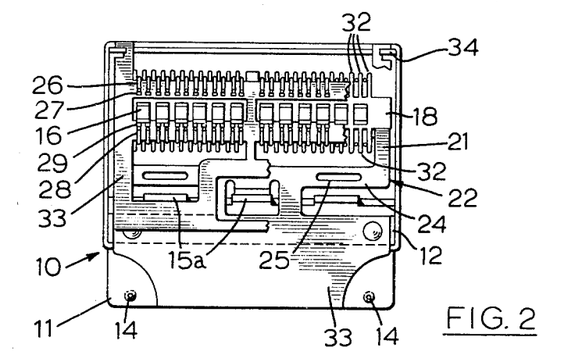
FIG. 2 is an end view, partly in section, of the relay shown in FIG. 1.
Figure 7:
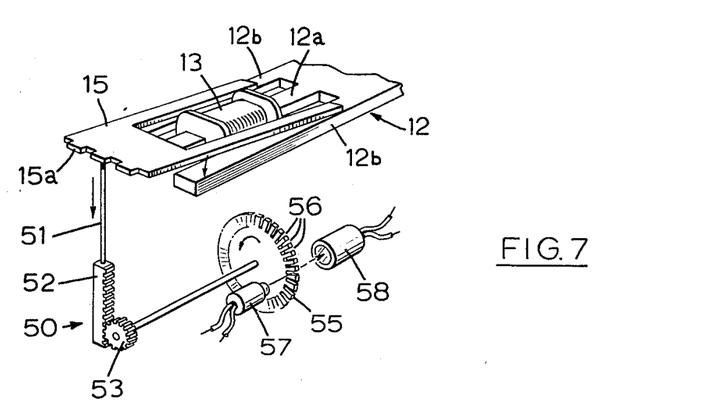
FIG. 7 (on the sheet of drawings carrying FIGS. 1 and 2) is a perspective view of a location-to-pulse transducer associated with the armature of the relay of FIG. 1.

FIGS. 1 and 2 of the drawings show a type of wire spring relay 10 with which the present invention is concerned. The relay consists of a base 11 on which is mounted an E-shaped core 12 with a coil 13 wound on the central arm 12a of the core. Leads 14 carry current to coil 13. A U-shaped laterally movable armature 15 is mounted on the outer arms 12b of core 12 as shown in FIG. 7 of the drawings with core 12 acting as a stop. A row of fixed contacts 16, each mounted on the end of a wire spring 17 and held in alignment by a pair of cross bars 18 and 19 is mounted on base 11. There are twelve contacts in the particular example illustrated and the unit constitutes a fixed comb 20. Wire springs 17 bias comb 20 towards core 12 whereby cross bar 18 bears against the upright legs 21 of a U-shaped locator 22 which is integral with an adjustment plate 23 fixed to the end of core 12. The base 24 of locator 22 carries a pair of longitudinal slots 25, one on each side of its transverse centre line.

An upper movable comb 26 of twelve make contacts 27 and a lower movable comb 28 of twelve break contacts 29 are fixed on base 11 and biased towards fixed contacts 16. Contacts 27 are each twinned as shown in FIG. 2 of the drawings, being supported by a pair of wire springs 30 which provide the bias towards the fixed contacts. Contacts 29 are each similarly twinned and supported by a pair of wire springs 31 similarly biased. Wire springs 30 and 31 move between rows of guide teeth 32 along the upper and lower sides of cross bar 18.

A template card 33 is located across the face of relay 10 in front of plate 23 and behind contacts 16, 28, 29 and the free end 15a of armature 15. A U-shaped flat spring 34 urges card 33 upwardly from core 12 and against wire springs 26, thus holding contacts 27 away from contacts 16 and holding armature 15 away from core 12, as shown in FIGS. 1 and 2 of the drawings. When armature 15 is moved towards core 12 by energization of coil 13, card 33 is moved downwardly by the armature against the action of spring 34, allowing contacts 27 to move against fixed contacts 16 and at the same time moving contacts 29 away from fixed contacts 16 in a make and break operation. When coil 13 is deenergized, spring 34 urges card 33 upwardly to return contacts 27 and 29 to their original open and closed positions of rest respectively.

Figure 3A:
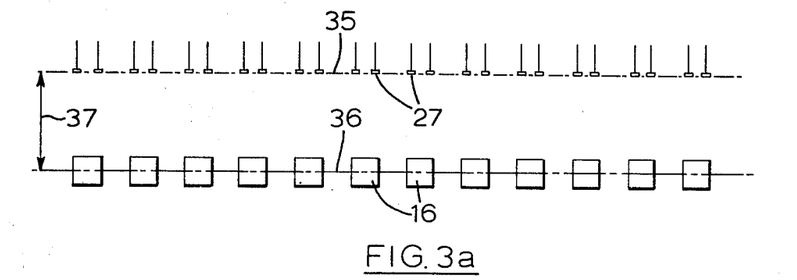
Figure 3B:
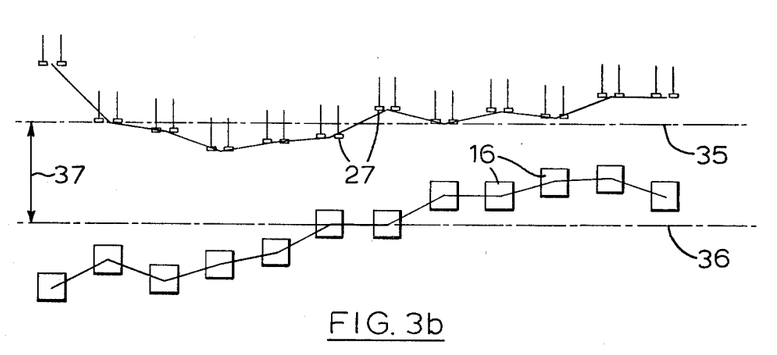
Figure 3C:
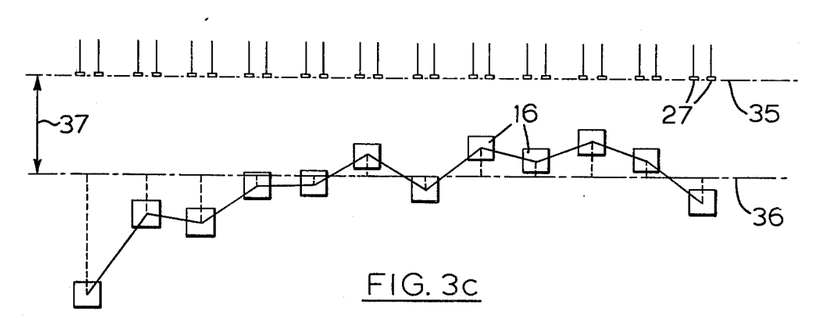
Figure 4A:
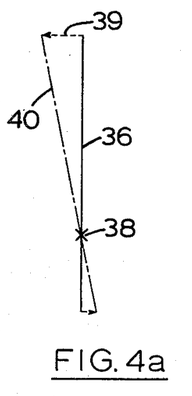
FIG. 4 is a schematic diagram of the movement required to reduce the deviation in the time of operation of the contacts of the relay with respect to a prescribed displacement of the armature from the core.
Figure 4B:
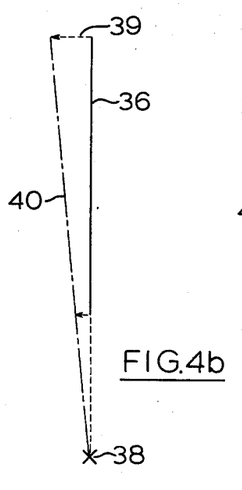
Figure 4C:
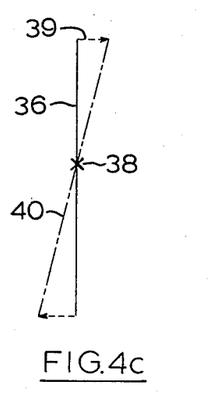
Figure 4D:
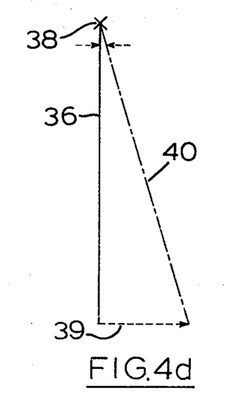

Considering now movable make contacts 27 for purposes of illustration, the ideal relationship or condition between fixed contacts 16 and movable contacts 27 when coil 13 is deenergized is shown in FIG. 3a of the drawings. It should be noted here that for purposes of simplicity a uniform spatial relationship is shown between make contacts 27 and fixed contacts 16. Actually non-uniformity in the spatial relationship between the movable contacts and the fixed contacts is prevalent in relays of his type, allowing the contacts to be operated at different time intervals. Selected variations in such time intervals may be obtained by providing suitable indentations along the edges of card 33 bearing against wire springs 30 and 31. The alignment of movable contacts 27 and fixed contacts 16 in the ideal relationship of FIGURE 3a is represented by nominal lines 35 and 36 respectively, nominal lines 35 and 36 being parallel and displaced a distance 37 one from the other. However, the actual relationship or condition between movable contacts 27 and fixed contacts 16 is irregular since the contacts deviate from nominal lines 35 and 36 as shown in FIGURE 3b of the drawings. An equivalent relationship or condition between contacts 16 and 27 may be represented as in FIGURE 3c of the drawings where movable contacts 27 are repositioned on nominal line 35 and the position of each fixed contact 16 is adjusted to give the same displacement from its associated movable contact as exists in the actual condition as shown in FIGURE 3b. This equivalent relationship is directly proportional to the displacement of armature 15 from core 12 at the time of operation of each individual contact (i.e. the armature gap value for each contact). Since it is not practical to adjust the relative positions of fixed contacts 16 one with another, nor is it practical to adjust movable contacts 27 one with another, the only feasible method of adjustment to reduce the deviations in the time of operation of each individual movable contact 27 with its associated fixed contact 16 is by adjusting the mean placement or location of the row of fixed contacts 16. Moreover, all contacts 27 must operate within a prescribed range of displacements of armature 15 with respect to core 12 (i.e. within a prescribed range of armature gap values) and the above-mentioned adjustment of the mean placement or location of fixed contacts 16 can be adapted to meet this added requirement. The construction of the relay enables the adjustment of the row of contacts 16 to be effected through legs 25 of locator 22 by inserting a tool into slots 25 and twisting the locator with respect to fixed plate 23 in their mutual plane. It will be appreciated that the same considerations are applicable to the row of movable break contacts 29 and their relationship with fixed contacts 16.

Figure 5A:
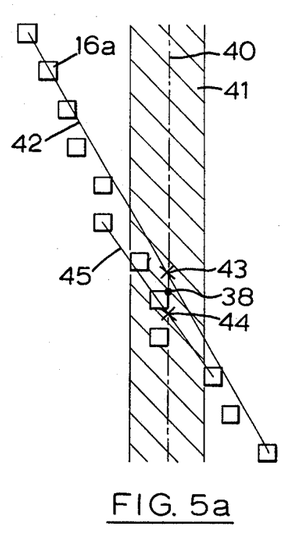
FIG. 5 is a schematic diagram showing the method of locating the centre of rotation of the approximate mean straight line of plotted armature displacement values at the time of operation of each individual contact of one set in the relay with respect to a prescribed displacement of the armature from the core.
Figure 5B:
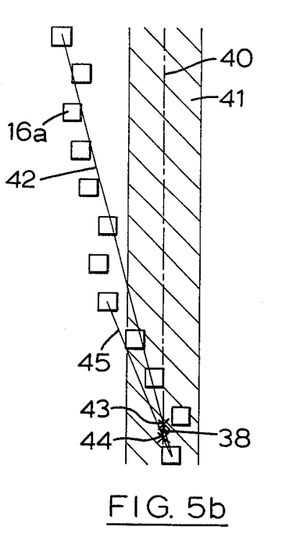
Figure 6:
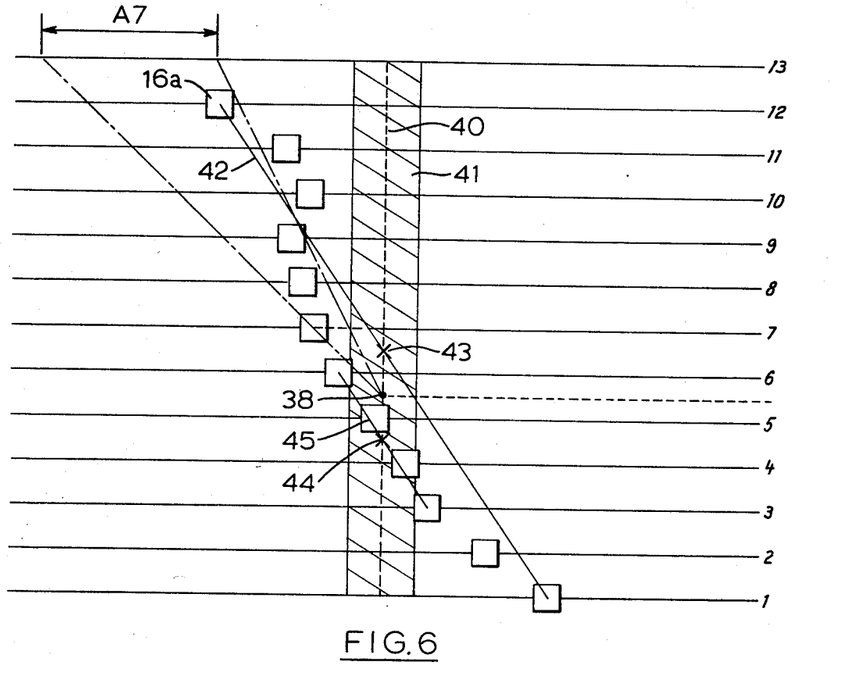
FIG. 6 is a schematic diagram showing the determination of the magnitude of adjustment required to bring the approximate mean straight line of FIG. 5a into coincidence with the prescribed displacement of the armature.

In FIGS. 5 and 6 the nominal line 40 represents a prescribed displacement of armature 15 from core 12 (the armature gap value) while the permissible range of displacement about line 40 is represented by hatched region 41, the object being to bring the operation of the contacts into the permitted range. To determine the adjustment of locator 22 required to accomplish this object the armature gap values are plotted for each contact with respect to nominal line 40. Such armature gap values are represented by plotted fixed contacts 16a. The value of two parameters must then be determined, namely (1) the location of the axis or centre of rotation about which the row of fixed contacts, as represented by the plotted armature gap values, must be moved, and (2) the amount of rotation or magnitude of adjustment of the row of fixed contacts 16 about said centre. FIGURE 4 illustrates these parameters for different patterns of armature gap values. It will be seen that the centre of rotation is translatable along line 36 and may be located on an extension of the line beyond the physical termination points of the row of contacts 16.

The determination of the location of centre of rotation 38 is illustrated in FIG. 5 of the drawings. FIG. 5a represents a condition where some of the armature gap values (as represented by plotted fixed contacts 16a) lie outside region 41 on both sides thereof. To obtain centre of rotation 38 under the condition shown in FIG. 5a a connecting line 42 is drawn between the outermost of plotted contacts 16a to intersect nominal line 40 at point 43. A connecting line 44 is also drawn between the innermost of plotted contacts 16a lying outside region 41 to intersect nominal line 40 at point 45. Centre of rotation 38 is taken as lying halfway between points 43 and 44. Centre of rotation 38 thus represents the point of intersection between line 40 and an approximate mean straight line of the displacements of armature 15 from core 12 at the time of operation of each individual contact 16 (and 27). FIG. 5b represents a condition where the plotted armature gap values lie either within region 41 or outside the region only on one side thereof. To obtain centre of rotation 38 under the condition shown in FIG. 5b, connecting line 42 is drawn between the outermost of plotted contacts 16a and the first contact in the comb to determine intersection point 43 while connecting line 45 is drawn between the first plotted contact 16a outside region 41 and the first plotted contact in the comb to determine intersection point 44, centre 38 being taken as lying halfway between points 43 and 44 as before. Where plotted contacts 16a lie totally outside region 41 on either side thereof a shift in the mean placement line of the plotted contacts converts the pattern into one of the arrangements shown in FIG. 5a or 5b by correction factors which can be calculated. Attention is drawn to FIG. 12 of the drawings which shows possible patterns of plotted contacts 16a. Here it should be observed that adjustment by the present invention cannot be effected for patterns of plotted contacts 16a where some of the fixed contacts lie outside region 41 on both sides thereof as shown in patterns h and j of FIG. 12.

The determination of the magnitude of rotation 39 of each fixed contact 16 about centre of rotation 38 (see FIG. 4) is shown in FIG. 6 of the drawings. For this purpose a position is assumed beyond the row of plotted contacts 16a, for example at a level 13 where there are twelve fixed contacts as illustrated. In the particular arrangement shown in FIG. 6, a centre of rotation 38 is determined graphically in the manner previously described and is located at level 5.5 taking the first contact as datum level 1. Taking the fixed contact at level 7 as an example it will be seen that the amount of adjustment required at level 13 to bring contact number 7 into region 41 is:

$$A7 = D7 \frac{13 - COR}{7 - COR}$$

where:

A7 is the adjustment required for the fixed contact 16 at level 7,
D7 is the deviation of that contact from region 41, and
COR is the calculated centre of rotation 38

The same correction is to be applicable to each fixed contact 16 using the general formula:

$$A(P) = D(P) \frac{13 - COR}{P - COR}$$

where:

P is the fixed contact 16 at the level considered,
A(P) is the adjustment required for that particular contact, and
D(P) is the deviation of that contact from region 41

In the apparatus of the invention the factors $$\frac{13 - COR}{P - COR}$$

for all corresponding values of COR and P are stored in the memory of the electrical control circuit. While values for centre of rotation 38 between levels 1 and 12 only are considered in the above formula, correction factors may be calculated for determining magnitude of rotation 39 where centre of rotation 38 lies outside levels 1 to 12, as mentioned above, and similarly stored.

In measuring the location of each plotted contact 16a by the present invention it is necessary to translate the movement of armature 15 into electrical pulses. A displacement-to-pulse transducer 50 for this purpose is illustrated in FIG. 7 of the drawings in which core 12, coil 13 and armature 15 of the relay are shown. Transducer 50 consists of a rod 51 having one end bearing against armature 15 adjacent free end 15a in a direction normal to the plane of the arm and carrying at its other end a rack 52 associated with a pinion 53. A shaft 54 connects pinion 53 to a circular disc 55 having a series of slots 56 located equidistantly around its periphery. A light source 57 is positioned on one side of disc 55 and a photoelectric cell 58 is located on the opposite side of the disc whereby light reaches cell 58 from source 57 through slots 56. By this apparatus the motion of armature 15 is translated into electrical impulses. Preferably transducer 50 is calibrated to translate 0.1 inch of linear motion of rod 51 into one complete revolution of disc 55 and by providing five hundred of slots 56 in the circumference of the disc an electrical impulse is obtained for each 0.0002 inch of movement of armature 15. One alternate means of pulsating the rotary movement of pinion 53 in shaft 54 would be to provide, in place of disc 55, a toothed gear rotating between a pair of magnetic heads whereby the gear teeth passing under the magnetic heads would cause an impedance change in the heads. It will be appreciated that the movement of armature 15 towards core 12 follows an arcuate path; however, the arcuate path has such a large radius that the number of pulses generated by transducer 50 is substantially proportional to the movement of the armature towards the core.

Figure 8:
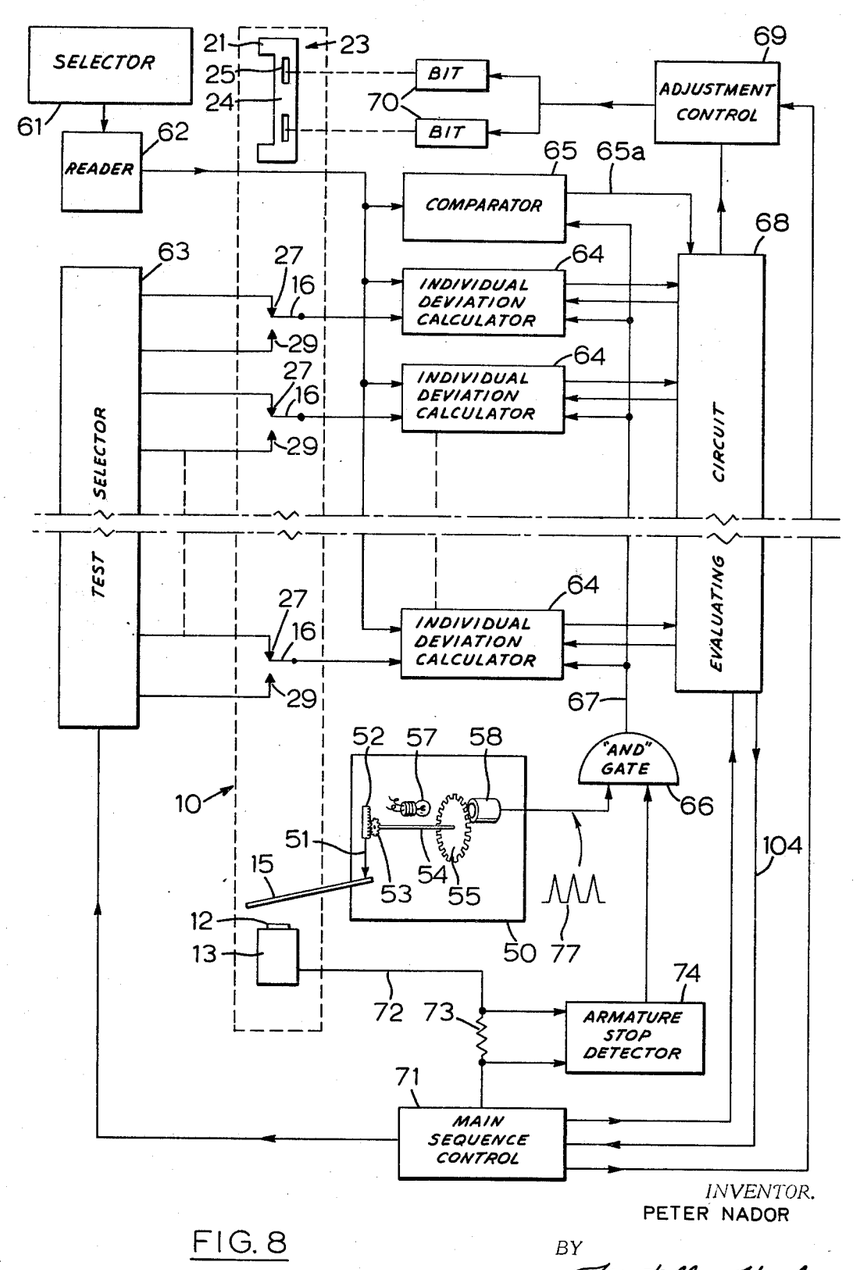
FIG. 8 is a block diagram of gauging and adjusting apparatus according to the invention.

Apparatus for measuring the location of each plotted contact 16a is shown schematically in FIG. 8 of the drawings. To permit different types of relays to be fed into the adjusting apparatus in a random manner each relay carries a code identification which passes a reading station (for instance a photo-electric cell reading a code stripe pattern) in a relay code selector 61 prior to entering the adjustor. The code identification may also be used for sorting subsequent to adjustment. Selector 61 identifies the type of relay and selects a section of a specification tape in a tape reader 62 (or any suitable memory such as a ferrite core or a drum having relevant codes). The specification tape carries the following information for each type of relay: (1) operating current, (2) operating time, (3) contact arrangement. A test selector device 63 enables all movable "make" or "break" contacts 27 or 29 in the tested relay to be grounded while at the same time fixed contacts 16 may each be connected to an individual deviation calculator 64 (to be described with reference to FIG. 10 of the drawings). Tape reader 62 feeds into each calculator 64 and also to a total armature travel comparator 65. A normally open "and" gate 66 connects with each deviation calculator 64 through a distribution bar 67. All deviation calculators 64 and comparator 65 feed into an evaluating circuit 68 which provides data to an adjustment control 69 governing the operation of adjustment apparatus consisting of a pair of bits 70 adapted to engage in slots 25 of locator 22. A main sequence control 71 connects with selector 63, evaluator 68, and adjustment control 69. Control 71 also supplies current to coil 13 of a test relay through a line 72. Tapping off line 72 about a resistor 73 is an armature stop detector 74 which feeds into gate 66. The test relay 10 of FIGS. 1 and 2 and the position-to-pulse transducer 50 of FIG. 7 are indicated schematically. Pulses 77 from photoelectric cell 58 of transducer 50 are fed into gate 66.

Before describing independent deviation calculators 64 and evaluator 68 it is necessary to describe the method of the invention. As mentioned above with respect to FIG. 5, contacts 27 and 29 have to operate (in conjunction with fixed contacts 16) within a prescribed range of armature gap values indicated by the lateral boundaries of region 41. By counting the number of pulses emitted by transducer 50 between the time a contact 27 or 29 operates and the time armature 15 meets core 12 and knowing the linear distance represented by one pulse (say 0.0002 inch) the position of operation of the contacts can be located with respect to region 41. In the operation of the apparatus of FIG. 8 transducer 50 generates pulses 77, which pass to normally open gate 66, as soon as armature 15 commences to move towards core 12 on energization of coil 13. Pulses appear on distribution bar 67 but are prevented from entering any particular deviation calculator 64 until the contact associated with that particular calculator operates at which time the calculator accepts and counts the pulses appearing on the bar. When armature 15 reaches core 12 stop detector 74 operates to close gate 66 and prevent any further pulses 77 from appearing on bar 67 by the overshoot of transducer 50. Stop detector 74 operates by utilizing a sharp decrease in current drawn by coil 13 at the instant armature 15 meets core 12.

Figure 9:
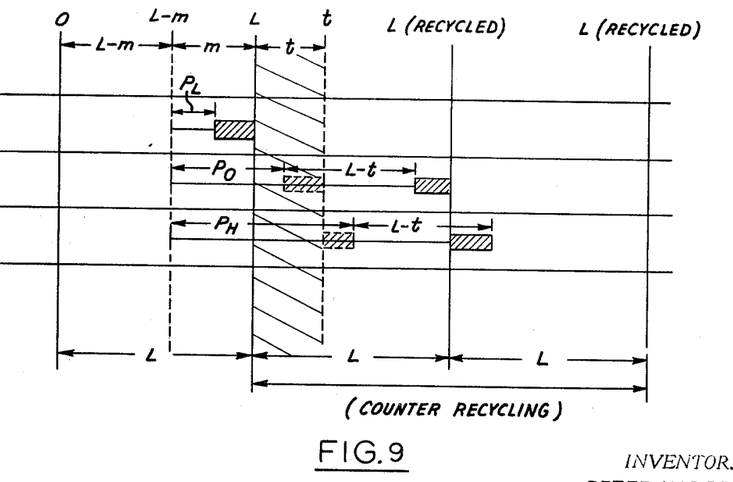
FIG. 9 (on the sheet of drawings carrying FIG. 6) is a graphic illustration of the method of calculating the armature gap value at the time of operation of each contact with respect to the nominal line representing a prescribed displacement of the armature and a permissible range of deviation therefrom.

At the end of the travel of armature 15, on closing of gate 66, the number of pulses 77 proportional to the armature gap value existing at the moment of operation of the tested contact is registered in the particular deviation calculator 64 associated with that specific contact. FIG. 9 illustrates the principle of calculating the position of the point of operation of each contact 27 or 29 by calculator 64 with respect to nominal line 36 of fixed contact 16, all distances being expressed by a corresponding number of pulses 77. An input counter in calculator 64 having a maximum capacity L expressed in binary form is preset to a value $L-m$ where $m$ (also expressed in binary form) is the minimum number of pulses 77 expected to be received corresponding to the specified minimum gap value of armature 15 at which tested contact 27 must operate (i.e. the latest permissible point at which contact 27 may operate before armature 15 meets core 12). It should be noted that the value of $m$ may be different for each relay and also different for each contact where the contacts of the relay are not set to operate simultaneously. The input counter of calculator 64 will receive a total number of accumulated pulses 77 from bar 67 and have a final binary value V. Three conditions are possible, as follows:

(1) Where contact 27 operates too late in the stroke of armature 15 and too few pulses are received by calculator 64 (hereinafter identified as LOW). In this condition the number of pulses P accumulated by calculator 64 does not exceed $m$, the final value V is less than L and there is no overflow in counter 78 of the calculator. $L-V$ is the binary value of deviation of operation of the contact from region 41.

(2) Where contact 27 operates within specified limits i.e. within region 41 (hereinafter identified as OK). In this condition there will be an overflow in counter 78 of calculator 64, since P is greater than $m$, and the counter will recycle. In this case $V=P-m$ and $t$ (the width of region 41) is greater than V. With an adding circuit the value $L-t$ is added to V to give an "adder value" $AV=V+L-t$ which is less than L. No overflow of the recycled counter occurs where the contact is within region 41. The location of operation of the contact within region 41 is given by the quantity $L-AV$.

(3) Where contact 27 operates too early in the stroke of armature 15 and too many pulses are received (hereinafter referred to as HIGH). In this condition the final counter value V will indicate an overflow in the recycled counter, i.e. the binary count of V will represent a value $V=P-m$ which is greater than $t$. When $L-t$ is added to this value of V by the adder circuit the adder value $AV=V+L-t$ is greater than L which produces an overflow in the adder circuit. The binary value of deviation of operation of the contact from region 41 will equal $AV-L=V-t$.

FIG. 9 shows graphically the operation of the binary input counter of individual deviation calculators 64 (not to scale and with region 41 exaggerated). $P_L$ represents the accumulated pulses where the contact operates too late and is out of limit on the LOW side, $P_O$ represents the accumulated pulses where the operation of the contact is within the specified limits (i.e. within region 41) and $P_H$ represents the accumulated pulses where the contact operates too early and is out of limit on the HIGH side. It will be appreciated that the value $L-t$ is added to the final value of the counter as a method of subtracting the value $t$ by the computer method.

A numerical example is shown in the following table where the maximum capacity L of the input counter of individual deviation calculator 64 is 511 and region 41 lies between .006 and .017 inch. Where one pulse represents a linear movement of 0.0002 inch of armature 15, the minimum number of pulses P which should be received is thirty and the maximum number is eighty-five (representing the minimum and maximum armature gap values in pulses). The counter having maximum capacity 511 (2 to the power 9) is set at 481 $(L-m)$ and the following calculations result:

TABLE

| | P | V | D |
|---|---|---|---|
| | No. of pulses received | Final counter value | Deviation value |
| Low | 20 | 501 | L−V<br>=511−501<br>=10 |
| OK | 65 | 35 | L−AV<br>=L−(V+L−t)<br>=511−35−511+55<br>=20 |
| High | 100 | 70 | V−t<br>=70−55<br>=15 |

Figure 10:
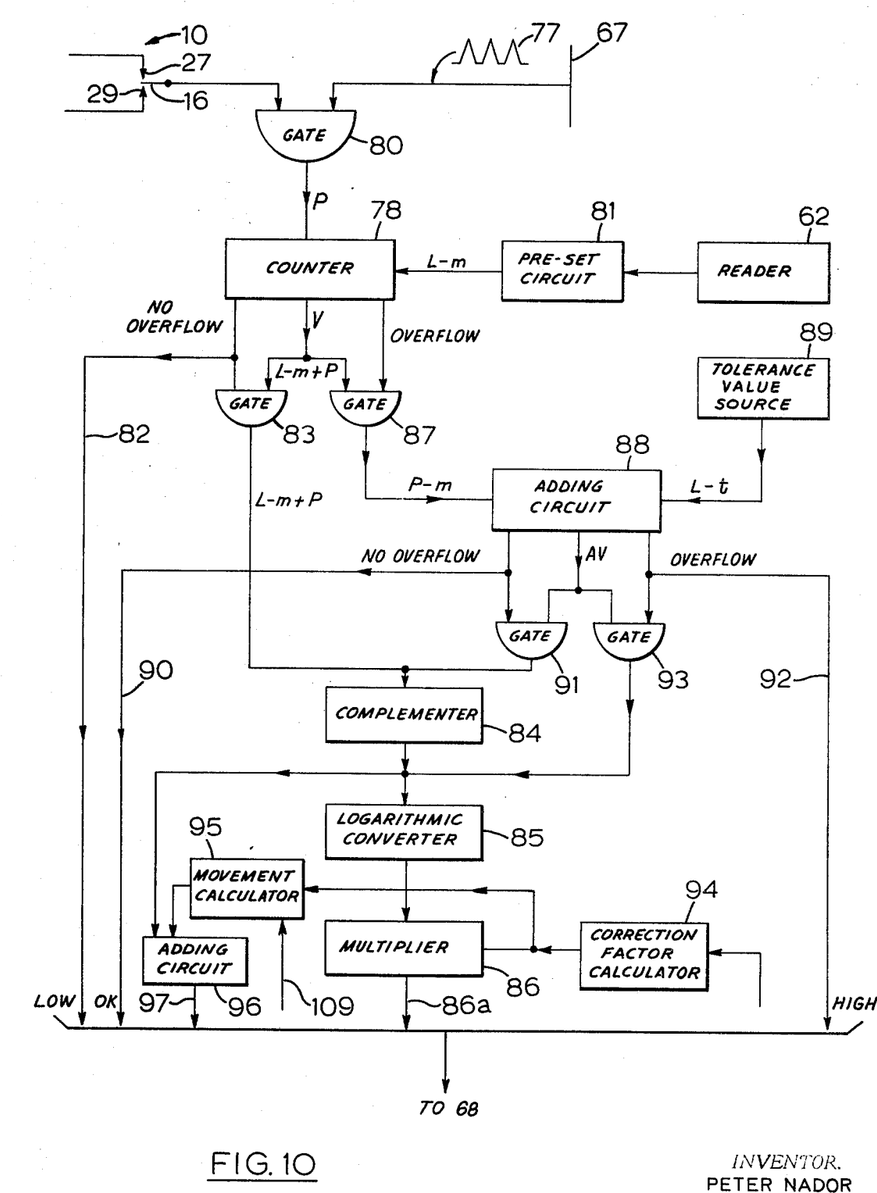
FIG. 10 is a block diagram of the individual deviation calculator shown in FIG. 8.

A block schematic diagram of individual deviation calculator 64 is shown in FIG. 10 of the drawings. Inputs from fixed contact 16 and distribution bar 67 are fed into an AND gate 80. The operation of fixed contact 16 and its associated movable contact 27 or 29 opens gate 80 allowing pulses 77 to pass to a counter 78 having a maximum capacity L which also receives information from tape reader 62 through a circuit 81 which presets counter 78 to the value $L-m$ with the value $m$ being supplied by the program tape. At the end of the measuring cycle when the total number of accumulated pulses P have been received by counter 78 the value of the counter is analyzed and the values routed as follows:

(1) If no overflow is detected a LOW lead 82 is activated to signal evaluator 68. A gate 83 receiving value V from counter 78 is also opened allowing $V(=L-m+P)$ to be fed into a complementing circuit 84 which calculates the deviation value $L-V$ which in turn is transmitted to a logarithmic converter circuit 85, producing an analogue voltage proportional to the logarithm of the value imposed on the input leads of circuit 85 in digital form. Logarithmic converter 85 feeds into a multiplier 86 which calculates the magnitude of adjustment 39 and feeds this value through a lead 86a to evaluator 68.

(2) If an overflow is detected in counter 78 a gate 87 is opened to pass counter value V to an adding circuit 88 which adds the value $L-t$ received from a tolerance value source 89. The resulting value from this addition is analyzed for overflow in the following manner:

(a) If no overflow occurs an OK lead 90 is activated to signal evaluator 68. A gate 91 is also opened to feed the adder value from circuit 88 to complementing circuit 84 in order to calculate the location of the point of operation of the contact, this quantity being transmitted to logarithmic converter 85 and multiplier 86 from whence the calculated magnitude of adjustment 39 is fed through lead 86a to evaluator 68.

(b) If there is an overflow from adding circuit 88 a HIGH lead 92 is activated to signal evaluator 68 and also to open a gate 93 which feeds the value of the overflow directly to logarithmic converter 85 since this value is the amount of deviation of the point of operation of the contact on the HIGH side and needs no modification by complementing circuit 84.

As mentioned previously, where fixed contacts 16 lie entirely outside region 41 on one side thereof it is necessary to apply a correction factor to the calculated deviation when determining the magnitude of adjustment 39. Due to the fact that this correction requires a multiplication which is difficult to perform using digital circuitry, the multiplier and the multiplicand are converted to corresponding logarithmic voltages and thus the multiplication is reduced to addition of two current values which is easily accomplished. A correction factor calculator 94 in individual deviation calculator 64 accepts a value of centre of rotation 38 from evaluator 68 through a line 94a and feeds to multiplier 86. A value is also fed from calculator 94 to a movement calculator 95 and thence to an adding circuit 96 which also receives values from complementing circuit 84 (and gate 93 in the case of deviations on the HIGH side), feeding the results to evaluator 68.

Figure 11:
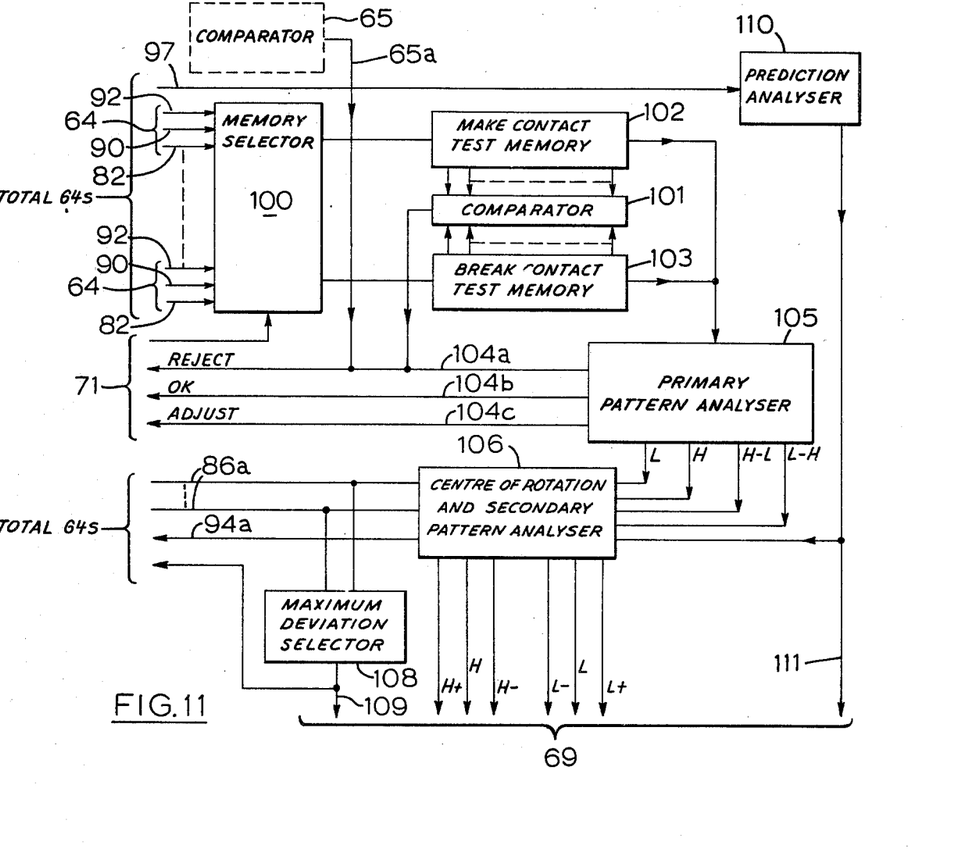
FIG. 11 is a block diagram of the evaluation circuit shown in FIG. 8.
Figure 12:
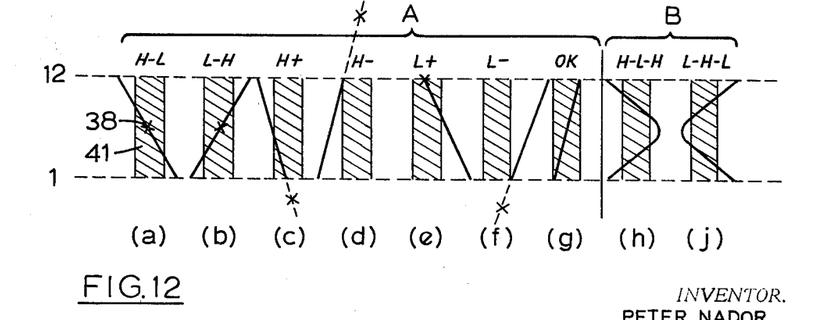
FIG. 12 shows the different deviation patterns of movable combs classified by the apparatus of the invention.

A block diagram of the evaluator 68 is shown in FIG. 11 of the drawings. The first function of evaluator 68 is to receive information from each individual deviation calculator 64 and to decide the classification of the deviation pattern assumed by the points of operation of all the contacts. The types of classification are shown in FIG. 12 of the drawings and are grouped according to whether they are capable of adjustment by the method of the present invention (Group A) or whether they have a pattern which cannot be adjusted (Group B). H indicates that contacts 27 or 29 are outside prescribed region 41 on the HIGH side, L indicates that the contacts are outside the prescribed region on the LOW side, and OK indicates the pattern which lies totally within the prescribed region of operation. If relay 10 requires adjustment and can be adjusted, evaluator 68 then determines the centre of rotation 38 and feeds back through line 94a to correction factor calculator 94 of each independent deviation calculator 64 the required correction signals applicable to the particular contact for the selected centre of rotation. Also, by analysing the modified deviation values supplied by each calculator 64, evaluator 68 selects the required magnitude of adjustment 39. When the required adjustment has been selected, evaluator 68 calculates the deviation pattern which will exist after the adjustment has been performed. If the new deviation pattern does not improve the condition, a new adjustment is suggested. If, however, the suggested adjustment improves the condition, adjustment control 69 is activated to have bits 70 perform the selected adjustment.

To perform the above functions the results of the measurements made by calculator 64 are received and stored in a memory selector 100 which stores the results of tests made both on the make and the break contacts. When all this data has been stored by memory selector 100 a comparator 101 checks to determine if there are any contradictory measurements in the contact tests, receiving the information from selector 100 through a make contact test memory 102 and a break contact test memory 103. If these tests contain contradictory values, the relay is tested again and if the second test also shows the same contradictory measurements the relay is rejected by a signal sent from comparator 101 through a line 104a to main sequence control 71. Total armature travel comparator 65 also feeds into line 104a and into control 71 through a line 65a via evaluator 68. If the check made by comparator 101 is satisfactory a primary pattern analyser 105 determines the deviation pattern classification (see FIG. 12) and also signals control 71 through a line 104b or 104c depending on whether the pattern is within the OK range or requires adjustment. The primary deviation pattern classification (L, H L—H or H—L) is transmitted to a secondary pattern analyser 106 which calculates the centre of rotation 38 and feeds the proper correction factors through line 94a to correction factor calculator 94 in each independent deviation calculator 64 which in turn supplies modified deviation values for the magnitude of adjustment through multiplier 86. A maximum deviation selector 108 selects the required magnitude of adjustment and activates movement calculator 95 through a lead 109 whereby the predicted position of the contact associated with each calculator 64 is supplied through lead 97 to a prediction analyser circuit 110. These predicted position values are analysed by circuit 110 and, depending on the result of this analysis, a signal is sent by line 111 to adjustment control 69 or a new adjustment is suggested.

I claim:
1. A method of reducing the deviation in the time of operation of each individual contact in a row of movable contacts with a row of fixed contacts of an armature-actuated relay, said row of fixed contacts being rotationally mounted and having a translatable centre of rotation, comprising the steps of:
  (1) energizing the relay to move the armature towards a stop whereby the contacts are operated during said movement,
  (2) generating a sequence of pulses where the number of pulses is substantially proportional to the linear displacement of the armature towards the stop,
  (3) counting the pulses with respect to each contact during the portion of armature movement when that contact is operated,
  (4) evaluating said pulse count to determine the displacement of the armature from the stop at the time of operation of each individual contact,
  (5) determining the movement required to rotate the entire row of fixed contacts about an axis to reduce the deviation of armature displacement at the time of operation of each individual contact, and
  (6) moving the entire row of fixed contacts accordingly.

2. A method as claimed in claim 1 in which said movement required to rotate the row of fixed contacts about an axis is determined by
  (1) determining the nominal line representing a prescribed displacement of the armature from the stop at the time of operation of each individual contact,
  (2) plotting said displacement of the armature from the stop at the time of operation of each individual contact,
  (3) determining the slope of the approximate mean straight line of said displacements with respect to said nominal line, and
  (4) rotating the approximate mean straight line of said displacements into coincidence with said nominal line.

3. An apparatus for reducing the deviation in the time of operation of each individual contact in a row of movable contacts with a row of fixed contacts in an armature-actuated relay, said row of fixed contacts being rotationally mounted and having a translatable point of rotation, comprising
  (1) means for energizing the relay to move the armature towards a stop whereby the contacts are operated during said movement,
  (2) means for generating a sequence of pulses where the number of pulses is substantially proportional to the linear displacement of the armature towards the stop,
  (3) means for counting the pulses with respect to each contact during the portion of armature movement when that contact is operated,
  (4) means for evaluating said pulse count to determine the displacement of the armature from the stop at the time of operation of each individual contact,
  (5) means for determining the movement required to rotate the entire row of fixed contacts about an axis to reduce the deviation of armature displacement at time time of operation of each individual contact, and (6) means for moving the entire row of fixed contacts accordingly.

4. An apparatus as claimed in claim 3 in which the means for determining the movement required to rotate the row of fixed contacts about an axis comprise (1) means for determining the nominal line representing a prescribed displacement of the armature from the stop at the time of operation of each individual contact, (2) means for plotting said displacement of the armature from the stop at the time of operation of each individual contact, (3) means for determining the slope of the approximate mean straight line of said displacements with respect to said nominal line, and (4) means for rotating the approximate mean straight line of said displacements into coincidence with said nominal line.

5. An apparatus as claimed in claim 3 in which the means for generating the sequence of pulses comprises a displacement-to-pulse transducer actuated by the armature.

6. An apparatus as claimed in claim 3 in which the means for generating the sequence of pulses comprises a rack and pinion actuatable by movement of the armature towards the stop and means to convert the mechanical rotational movement of the pinion into intermittent electrical energy.

7. An apparatus as claimed in claim 6 in which the means to convert the mechanical rotational movement of the pinion into intermittent electrical energy comprises a disc coupled with the pinion and rotational therewith and having a uniformly slotted periphery, a light source on one side of the disc, and a photoelectric cell on the other side of the disc energized by the light source through the slots.

References Cited

UNITED STATES PATENTS

| | | | |
|---|---|---|---|
| 2,805,388 | 9/1957 | Brown | 324—28 |
| 2,831,161 | 4/1958 | Blaha | 324—28 |
| 2,940,312 | 6/1960 | Smith | 73—133 XR |

RUDOLPH V. ROLINEC, Primary Examiner

E. L. STOLARUN, Assistant Examiner

U.S. Cl. X.R.

235—151.32; 250—231